(12) United States Patent  
Hines

(10) Patent No.: US 7,868,077 B1  
(45) Date of Patent: Jan. 11, 2011

(54) ATHLETIC TRAINING SHOE INSERTS AND METHOD OF FABRICATION

(76) Inventor: William J. Hines, 27 Woodland Dr., Vernon, NJ (US) 07462

( * ) Notice: Subject to any disclaimer, the term of this patent is extended or adjusted under 35 U.S.C. 154(b) by 899 days.

(21) Appl. No.: 11/653,515

(22) Filed: Jan. 16, 2007

Related U.S. Application Data

(60) Provisional application No. 60/758,857, filed on Jan. 13, 2006.

(51) Int. Cl.
  *C08K 3/10* (2006.01)
  *A43B 5/00* (2006.01)
(52) U.S. Cl. .......................... 524/413; 36/132
(58) Field of Classification Search ............ 524/413
  See application file for complete search history.

(56) References Cited

U.S. PATENT DOCUMENTS

2006/0003160 A1 * 1/2006 Goldberg .............. 428/343

FOREIGN PATENT DOCUMENTS

GB  2100969 A  *  1/1983

* cited by examiner

*Primary Examiner*—Ling-Siu Choi
*Assistant Examiner*—Hui Chin
(74) *Attorney, Agent, or Firm*—Parsons & Goltry; Robert A. Parsons; Michael W. Goltry

(57) ABSTRACT

An athletic training shoe weighted insert including a metallic powder filled thermoplastic elastomer is formed. A method of manufacturing the athletic training shoe weighted insert with a desired softness or durometer and a desired specific gravity includes the steps of selecting a metallic powder filler, with a desired specific gravity, and a thermoplastic elastomer, and a plasticizer that will produce the desired softness of the weighted insert. The method includes a compounding step of combining the thermoplastic elastomer, metallic powder and plasticizer into a pelletized compound with a desired quantity or percentage of the metallic powder filler to bring the specific gravity to the desired level and to achieve the desired softness. In a preferred embodiment the pelletized compound is then formed into the finished insert by use of the plastic injection molding process.

10 Claims, No Drawings

ATHLETIC TRAINING SHOE INSERTS AND METHOD OF FABRICATION

CROSS-REFERENCE TO RELATED APPLICATIONS

This application claims the benefit of U.S. Provisional Application No. 60/758,857, filed 13 Jan. 2006.

FIELD OF THE INVENTION

This invention relates to personal training weights.

More particularly, the present invention relates to training weights for use in athletic training and physical therapy.

In a further and more specific aspect, the instant invention concerns the use of shoe inserts as training weights that increase the time weighted energy requirements of the participant.

BACKGROUND OF THE INVENTION

The present invention includes a weighted training shoe insert and a method of fabricating a weighted training shoe insert having a higher than 1.0 specific gravity and a low Shore A Durometer. Weighted inserts have been attempted in the past, but have limited use due to fabrication problems and the difficulty of obtaining a proper weight with a desired hardness or Durometer.

Weighted inserts can be fabricated with a two-component thermoset urethane system with powdered metal added to liquid urethane components to increase the specific gravity of the part. The problem with casting inserts in this manner is that the specific gravity of the desired compound is limited, resulting in much less weight than desired for the insert. Due to the low specific gravity, to achieve a sufficient weight for the insert, a cast insert must be thicker than desirable.

The specific gravity is limited in the casting process because the addition of the powdered metal significantly increases the viscosity of the two-component urethane. Above a certain viscosity, the material can no longer be cast easily. The estimated specific gravity of inserts of this type is about 3.0 to 3.5. Increasing the specific gravity to the high end of this range greatly increases the difficulty in the casting process, because of the significant viscosity increase referred to above and this result requires additional, more costly equipment. Thus, it can be seen that achieving the desired higher specific gravity is severely limited by the process.

It would be highly advantageous, therefore, to remedy the foregoing and other deficiencies inherent in the prior art.

It is an object of the present invention to provide new and improved athletic training shoe weighted inserts and a method of fabrication.

Another object of the present invention is to provide new compositions that can be easily manufactured into improved athletic training shoe weighted inserts with a desired specific gravity and a low Shore A Durometer to maximize comfort.

Another object of the present invention is to provide a new and improved method of manufacturing weighted athletic training inserts or insoles that have a higher than 1.0 specific gravity for athletic training and physical therapy.

SUMMARY OF THE INVENTION

Briefly, to achieve the desired objects of the instant invention of an athletic training shoe weighted insert a metallic powder is compounded with a thermoplastic elastomer. By selecting the thermoplastic elastomer and the metallic powder filler from a variety of available materials and adjusting the amount of each material used, the athletic training shoe weighted insert can be manufactured with a desired softness or durometer and a desired specific gravity.

A method of manufacturing the athletic training shoe weighted insert with a desired softness or durometer and a desired specific gravity includes the steps of selecting a metallic powder filler with a desired specific gravity, a thermoplastic elastomer, and a plasticizer that will produce the desired softness of the weighted insert. The method involves the compounding of the thermoplastic elastomer, the metallic powder and the plasticizer into an athletic shoe insert with a desired quantity or percentage of the metallic powder filler to bring the specific gravity to the desired level and to achieve the desired softness. As the specific gravity of the material is raised by adding more filler, the ratio of thermoplastic elastomer and plasticizer must be changed to achieve a material of the desired durometer.

In a preferred embodiment the athletic training shoe weighted inserts are formed by a plastic injection molding process. The athletic training shoe weighted inserts can alternatively be formed by extruding sheets of the thermoplastic elastomer and metallic powder, and die cutting athletic shoe inserts from the extruded sheets.

DESCRIPTION OF A PREFERRED EMBODIMENT

In a preferred embodiment of the present invention, a metallic powder filled thermoplastic elastomer (TPE) is employed instead of a two component cast urethane liquid system. An athletic training shoe weighted insert is fabricated using a TPE compound and a plastic injection molding process to produce the desired product.

An injection molding grade, high specific gravity polyurethane compound using thermoplastic polyurethane (TPU) can be employed for the weighted inserts. However, thermoplastic TPU chemistry is limited in hardness (on the low side) to about 60 shore A and addition of filler (metallic powder) increases the hardness and stiffness making the insert less desirable. Additionally, there are other TPE polymers such as styrenic block copolymer (SBC) which can be employed to provide a hardness range matching the current cast system, but they have lower physical properties and poorer aging. By employing a TPE, based on SEBS, SEPS or similar elastomers with comparable molecular weights, the specific gravity can be greatly increased to as much as 6.0. Higher specific gravities, such as 6.0 to 11.0 can be achieved with the addition of higher specific gravity fillers, such as tungsten, but with a great increase in cost.

Thus, in a specific embodiment, a combination of a thermoplastic material and plasticizer having a shore A of approximately 0 to 10 is employed. Addition of filler material with the desired specific gravity, such as copper, iron, etc, can then be added to the material. The added filler increases the specific gravity and stiffens and hardens the material to the desired level, typically, but not limited to, the 15 to 45 Shore A range. With the use of thermoplastic material as much as ninety percent filler material can be employed increasing the specific gravity of the compound to approximately 60% of it the specific gravity of the metal powder being employed. Thus, an athletic training shoe weighted insert of standard size can be produced with substantially increased weight.

The thermoplastic materials used include SEBS (styrene ethylene butylenes styrene), thermoplastic urethane (TPU) and styrenic block co-polymers (SBC), thermoplastic polyolefins (TPO) and polyether block amides (PEBA). The filler materials can be any powder of the desired specific gravity, and include iron, carbonyl iron, water atomized iron, zinc, copper, tungsten, etc. Particle sizes in the range of 5 to 65 microns are desirable. Metallic salt fillers may also be used. Conventional plastic fillers such as calcium carbonate, magnesium silicate, calcium silicate and barium sulfate may be used for lower specific gravity compositions. A preferred particle size for these powders is in the 1 to 15 micron range.

The softness and weight of the final product will be determined by the thermoplastic selected, the amount and type of filler chosen and the amount of plasticizer. In this tri-component system, it is useful to look at the thermoplastic elastomer (e.g. SEBS) and plasticizer combination as one material, typically referred to as a "polymeric compound". The specific gravity of a resultant combination with metal powder would depend on the weight percentage of the metal powder added or in simpler terms the weight ratio of metal powder to polymeric compound. At any given weight percent of metal powder in the composition, the Shore A hardness (stiffness) of the composition is a function of the weight ratio of the thermoplastic elastomer to the plasticizer. In the design of these compounds, one must first choose the final specific gravity desired, which determines the percent of metal powder required and then determine the Shore A hardness value desired, which can be derived from the weight ratio of thermoplastic elastomer to plasticizer. For example, it takes 80% of carbonyl iron to achieve a 3.5 specific gravity compound. That leaves 20% by weight for the polymeric compound. If that is comprised of 50% SEBS (10% of total compound) and 50% oil (plasticizer), then the Shore A hardness will be about 30. By changing the SEBS to 40% (8% of total compound) and the oil 60%, the Shore A will drop to 20.

The actual fabrication can be quickly and economically accomplished. Pellets of the desired material can be pre-prepared. The pellets include the thermoplastic, with filler and plasticizer. Thus, the pellets have the desired durometer and specific gravity. These pellets of material are then supplied to a conventional injection molding machine having the insert molds. The process of injection molding is well known and will not be described in detail. Alternatively, sheets of the material can be extruded, and the inserts die cut from the extruded material.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of manufacturing an athletic training shoe weighted insert comprising the steps of:
   selecting a metallic powder filler with a desired specific gravity;
   selecting a thermoplastic elastomer;
   compounding the metallic filler with the thermoplastic elastomer and a plasticizing material into pellets; and
   forming the thermoplastic elastomer compound into an athletic shoe insert.

2. A method as claimed in claim 1 wherein the step of forming includes one of a plastic injection molding process and a process of extruding sheets of the thermoplastic elastomer compound and die cutting athletic shoe inserts from the extruded sheets.

3. A method of manufacturing an athletic training shoe weighted insert with a desired softness or durometer and a desired specific gravity comprising the steps of:
   selecting a metallic powder filler with a desired specific gravity;
   selecting a thermoplastic elastomer and a plasticizer compound with a softness softer than the desired softness of the weighted insert; and
   forming the thermoplastic elastomer, plasticizer and metallic powder into an athletic shoe insert with a desired quantity or percentage of the metallic powder filler to bring the specific gravity to the desired level and to achieve the desired softness.

4. A method as claimed in claim 3 wherein the step of forming includes a plastic injection molding process.

5. A method as claimed in claim 4 further including steps of forming pellets of the thermoplastic elastomer and plasticizer with the metallic powder filler, the pellets having the desired softness or durometer and the desired specific gravity, and using the pellets in the plastic injection molding process.

6. A method as claimed in claim 3 wherein the step of forming includes extruding sheets of the thermoplastic elastomer, plasticizer and metallic powder, and die cutting athletic shoe inserts from the extruded sheets.

7. A method as claimed in claim 3 wherein the step of selecting the metallic powder filler includes selecting the metallic powder filler from one of iron, carbonyl iron, water atomized iron, zinc, copper, and tungsten.

8. A method as claimed in claim 3 wherein the step of selecting the thermoplastic elastomer includes selecting the thermoplastic elastomer from one of a thermoplastic polyurethane, styrenic block copolymer, styrene-ethylene-butylene-styrene, and styrene-ethylene-propylene-styrene (SEPS).

9. A method as claimed in claim 3 wherein the step of forming includes using less than ninety percent metallic powder.

10. A method as claimed in claim 3 wherein the step of forming includes using particles of metallic powder with a size in a range of 5-65 microns.

* * * * *